United States Patent
Stenzel et al.

(10) Patent No.: US 8,999,500 B2
(45) Date of Patent: Apr. 7, 2015

(54) SEMIFINISHED PRODUCTS WITH A STRUCTURED SINTER-ACTIVE SURFACE AND A PROCESS FOR THEIR PRODUCTION

(75) Inventors: Melanie Stenzel, Goslar (DE); Andreas Scharf, Bad Harzburg (DE); Helmut Haas, Achim (DE); Holger Brumm, Goslar (DE); Timo Langetepe, Goslar (DE); Christoph Schnitter, Holle-Sottrum (DE)

(73) Assignee: H.C. Starck GmbH (DE)

( * ) Notice: Subject to any disclaimer, the term of this patent is extended or adjusted under 35 U.S.C. 154(b) by 722 days.

(21) Appl. No.: 12/377,714
(22) PCT Filed: Aug. 10, 2007
(86) PCT No.: PCT/EP2007/058293
§ 371 (c)(1), (2), (4) Date: Feb. 17, 2009
(87) PCT Pub. No.: WO2008/019992
PCT Pub. Date: Feb. 21, 2008

(65) Prior Publication Data
US 2010/0068510 A1 Mar. 18, 2010

(30) Foreign Application Priority Data
Aug. 16, 2006 (DE) .......................... 10 2006 038 502

(51) Int. Cl.
*G11B 5/64* (2006.01)
*H01G 9/042* (2006.01)
*H01G 9/052* (2006.01)
(52) U.S. Cl.
CPC ............... *H01G 9/042* (2013.01); *H01G 9/052* (2013.01)

(58) Field of Classification Search
USPC ............... 148/281, 527, 537; 427/126.1, 328; 428/336, 409, 335
See application file for complete search history.

(56) References Cited

U.S. PATENT DOCUMENTS

| 3,997,341 | A | * | 12/1976 | Janowski et al. ............... 419/57 |
| 5,729,428 | A | | 3/1998 | Sakata et al. |
| 5,986,877 | A | | 11/1999 | Pathare et al. |
| 6,226,173 | B1 | | 5/2001 | Welsch et al. |
| 6,231,689 | B1 | * | 5/2001 | Fife .............................. 148/281 |

(Continued)

FOREIGN PATENT DOCUMENTS

| CN | 1308566 A | 6/1998 |
| CN | 1694973 A | 11/2005 |

(Continued)

OTHER PUBLICATIONS

B. Holman, "The Electrical Characterization of Tanalum Capacitors as Mis Devices", A Thesis Presented to the Graduate School of Clemson University, 138 pages, Aug. 2008.

(Continued)

*Primary Examiner* — Mark Ruthkosky
*Assistant Examiner* — Daniel J Schleis
(74) *Attorney, Agent, or Firm* — Drinker Biddle & Reath LLP

(57) ABSTRACT

The invention comprises semifinished products with a structured surface, the semifinished product comprising an oxidized and subsequently re-reduced surface containing at least one refractory metal, and also a process for their production and their use for producing high-capacitance components.

17 Claims, 4 Drawing Sheets

(56) References Cited

U.S. PATENT DOCUMENTS

| | | |
|---|---|---|
| 6,307,733 B1 | 10/2001 | Maruyama et al. |
| 6,325,831 B1 | 12/2001 | Chiavarotti et al. |
| 6,452,783 B1 | 9/2002 | Chiavarotti et al. |
| 6,495,021 B2 | 12/2002 | Welsch et al. |
| 6,510,044 B1 | 1/2003 | Loeffelholz et al. |
| 2003/0230167 A1 | 12/2003 | Loeffelholz et al. |

FOREIGN PATENT DOCUMENTS

| | | |
|---|---|---|
| DE | 19616200 A1 | 11/1996 |
| DE | 19817405 A1 | 10/1999 |
| DE | 10003261 A1 | 8/2000 |
| DE | 10307716 A1 | 9/2003 |
| EP | 1162636 A1 | 12/2001 |
| JP | 2003522420 A | 7/2003 |
| JP | 2003277811 A | 10/2003 |
| RU | 2230629 C2 | 6/2004 |
| RU | 2232720 C2 | 7/2004 |
| SU | 851511 A1 | 2/1979 |
| WO | WO 00/15555 A1 | 3/2000 |
| WO | WO 00/67936 A1 | 11/2000 |
| WO | WO-01/57928 A1 | 8/2001 |
| WO | WO 2004/042095 A1 | 5/2004 |

OTHER PUBLICATIONS

G. J. Korinek, "Tantalum in Solid Electrolytic Capacitors—New Developments", Materials Transactions, JIM, vol. 37, No. 5, pp. 1244-1246, 1996.

J. D. Prymak, "Improvements iwth Polymer Cathodes in Aluminum and Tantalum Capacitors", 9 pages, APEC Conference 2001.

J. D. Prymak, "Replacing $MnO_2$ with Conductive Polymer in Tantalum Capacitor", 5 pages, CARTS-Europe '99.

M. M. Lohrengel et al., "Dielectric Oxide Films on Sintered Tantalum", 9 pages, CARTS Conference, 2012.

* cited by examiner

SEMIFINISHED PRODUCTS WITH A STRUCTURED SINTER-ACTIVE SURFACE AND A PROCESS FOR THEIR PRODUCTION

PRIORITY

Priority is claimed as a national stage application (under 35 U.S.C. §371) of PCT/EP2007/058293, filed Aug. 10, 2007, which claims benefit of German application 102006038502.0, filed Aug. 16, 2006.

The present invention relates to semifinished products, such as for example wires or sheets, of refractory metals with a structured sinter-active surface and semifinished products which at least partially have such a surface and also to their production and use.

Capacitors are an essential component in electrical engineering. In particular for the increasing number of portable devices and the rapidly further developing computer technology, these components have to meet ever greater requirements. For mobile applications, the overall sizes of the components are becoming ever smaller, while electrical parameters, such as in particular the capacitance and dielectric strength, remain the same. The constantly decreasing cycle times of processors (CPUs) require that the components also respond, and have lower resistances (equivalent series resistance (ESR)) or inductances (ESL). This presents great challenges for the materials and techniques that are used.

To increase the capacitance of electrical components, it is popular to use high-capacitance powders. The specific charge of the powders must in this case become greater and greater, in order that the volume yield of capacitance for small components increases. While the upper limit in the year 2000 was 70,000 µC/g, today there are powders with capacitances of about 100,000 to 200,000 µC/g. The higher charge of the powders is achieved substantially by increasing the specific surface area.

To produce anodes for capacitors, the powder is usually pressed with the semifinished product, for example a wire, and sintered at high temperatures of generally over 1200° C. in a high vacuum. This is accompanied by a loss of specific surface area of the powder.

With increasing charge of the powders, that is to say also increasing specific surface area, this loss becomes greater and greater, since the powders become ever more sinter-active. In order to obtain the highest possible charge in the capacitor, it is therefore attempted to keep the sintering temperature as low as possible to minimize this loss. On the other hand, the bonding of the powder to the anode conductor is of decisive importance for the quality of the capacitor. Good bonding is important for the further processability in the process, the residual current behaviour and the stability with respect to current and voltage peaks. A bonding area that is as large as possible produces particularly low resistances and consequently low ESR values.

Consequently, the forming of a good bond with respect to the anode conductor is a hurdle in the use of particularly high-capacitance powders for producing high-capacitance semifinished products, since these powders may only be sintered at relatively low temperature. Higher temperatures reduce the surface area too much, so that the required charge cannot be obtained. In addition, semifinished products which are used for the production of anode conductors, such as for example wire or sheets, have already been treated at high temperatures in their production, for example in the melt-metallurgical production of ingots, which are subsequently drawn into wires or rolled into sheets, and accordingly have a very smooth surface. At lower temperatures, they are therefore not very sinter-active and show only a low tendency to bond with the fine surfaces of the powders. The pulling-off force of the sintered-on high-capacitance powders from the semifinished product is low.

U.S. Pat. No. 6,226,173 B1, U.S. Pat. No. 6,495,021 B2 and WO 01/57928 A1 describe the production of anodes in the form of an electrically conducting, sponge-like structure, which is produced by oxidation, subsequent reduction and directed application of the electrically conducting substance in dentritic form on a substrate. This creates high-capacitance components. After that, a dielectric film may be produced on the surface of the sponge. However, the depositing process is relatively laborious.

Against this background, there is a need for semifinished products for the production of high-capacitance components that can be sintered with high-capacitance materials, so that the components have an adequate mechanical stability and stability with respect to current and voltage peaks.

The object is achieved by semifinished products with a structured surface, the semifinished product comprising an oxidized and then re-reduced surface containing at least one refractory metal. On account of their roughened surface structure, such semifinished products are particularly suitable for coating with high-capacitance materials by means of sintering.

A semifinished product is understood as meaning with preference anodes or anode conductors, for example in the form of wires, sheets, strips or other moulded parts. Such anode conductors may be coated with a refractory metal, with preference from the group comprising titanium, zirconium, hafnium, vanadium, niobium, tantalum, chromium, molybdenum and/or tungsten, or consist directly of these materials. Preferred refractory materials are titanium, tungsten and molybdenum and, in particular, niobium and tantalum. Furthermore, alloys containing such refractory metals, in particular with aluminium, silicon, zinc, cadmium, gallium, germanium, indium, tin, antimony, tellurium, thallium, lead, bismuth, yttrium or a rare earth element or the said refractory metals themselves, such as for example Ta—Ti, Nb—Ti, Nb—V or Ta—Nb alloys, may also be used.

The anode conductor and/or the coating may additionally be doped with different metals and/or metal ions or with phosphorus, nitrogen or boron. Dopings with these elements are known in principle and usually used in the case of dopings with nitrogen in the range from 10 ppm to 10,000 ppm, in the case of phosphorus in amounts from 10 ppm to 1000 ppm and in the case of boron in amounts from 10 ppm to 1000 ppm. In the case of the coated anode conductors, the refractory metal may be applied on another electrically conductive metal, such as for example silver, copper or aluminium. The coating of the anode conductor with refractory metals has with preference a thickness between 10 nm and 1 mm, better 100 µm, in particular between 10 nm and 50 µm, with particular preference between 100 nm and 10 µm.

The semifinished products according to the invention also comprise a structured surface, which is a layer produced by oxidation and reduction of the oxidized surface. The surface is characterized by a roughened structure, open-pored structures being preferred.

The semifinished products according to the invention are distinguished in a preferred embodiment by the fact that the specific surface area of the semifinished product after the treatment according to the invention in comparison with the surface area before the treatment according to the invention is greater by a factor of 10 to 100,000, or 10 to 10,000, or 10 to 1000, or 10 to 100, or 100 to 10,000, or 100 to 1000. The treatment according to the invention comprises an oxidation and a subsequent reduction of the semifinished product.

Preferred semifinished products have surfaces which, when forming with 20 V, have a capacitance of over 100 nF, with preference between 1 µF and 50 µF, with particular preference between 2 µF and 10 µF per cm² of base area. The base area is understood as meaning the area of the semifinished product before the oxidation/reduction treatment. The preferred capacitance values relate to treated layers with a thickness between 50 nm and 100 µm (1 µF and 50 µF (forming with 20 V)) or 100 nm and 1 µm (2 µF and 10 µF (forming with 20 V)). The measured capacitances are proportional to the increase in the specific surface area of the semifinished product that has been produced by the oxidation/reduction treatment.

The capacitance of semifinished products not treated according to the invention lies below 200 nF per cm², in particular 10 nF per cm². The capacitance of treated semifinished products lies above 1 µF per cm². The preferred capacitance values consequently indicate structured surfaces which on the one hand themselves have a high capacitance and on the other hand are particularly suitable for stably bonding high-capacitance materials by means of a sintering process.

"High capacitance" is the term used according to the invention for materials which have a high specific surface area. For instance, a material with a specific surface area >0.3 m²/g may be referred to as high capacitance. The capacitor equation shows that the capacitance C is proportional to the specific surface area A and inversely proportional to the thickness of the dielectric d. The proportionality factor e is defined as the dielectric constant, where $C=\epsilon*A/d$.

High-capacitance semifinished products is the term used for semifinished products with a ratio of microscopic to macroscopic surface area or structured to unstructured surface area of at least 10. An untreated macroscopic surface area of, for example, 1 cm² therefore has after the treatment according to the invention a microscopic surface area of at least 10 cm².

The capacitor equation as set out above allows to calculate the microscopic surface are after anodisation of the surface of the semifinished product according to the invention and determination of its capacitance. The capacitance thus detected consequently is a function of the microscopic surface and can be used as a measure thereof.

Since anodisation does influence the actual microscopic surface, since parts of the surface might become insulated from the rest of the semifinished product, so they do not contribute to the detected capacitance. As a result, the actual microscopic surface of the semifinished products may well be higher than determined with this method.

It can be shown by scanning electron microscope photos that the structured surfaces have openings of different forms, openings with average distances between walls of from 10 nm to 10 µm dominating in particular.

Depending on the intended use of the semifinished products, it is not absolutely necessary for the entire surface of the semifinished products to be activated by subsequent sintering. In the production of high-capacitance components, usually surface areas of from 0.2 mm² to 1 cm² are coated with a high-capacitance material, so that a corresponding partial surface treatment of the semifinished product may be adequate. For the purposes of this invention, semifinished products that comprise an oxidized and then re-reduced surface, containing a refractory metal, are both completely and partially surface-treated semifinished products.

A further subject matter of the present invention is a process for producing the surface-structured semifinished products, the surface of the semifinished product, containing at least one refractory material, being oxidized and then the oxide layer obtained being re-reduced.

The oxidation/reduction treatment of the surface in particular allows semifinished products produced commercially under heat treatment, such as for example melt-metallurgically drawn wires or rolled sheets, to be transformed into sinter-active semifinished products.

For the production of the surface-structured semifinished products, at least part of the surface of the semifinished product is subjected to an oxidation. The oxidation may be, for example, a thermal, chemical or anodic oxidation, an oxide layer with a preferred thickness between 10 nm and 1 mm, better 100 µm, in particular between 50 nm and 10 µm, with particular preference between 100 nm and 1 µm, being produced on the semifinished product. With preference, an anodic oxidation is performed at a voltage with preference between 1 V and 50,000 V, with particular preference between 5 V and 1000 V in an electrolyte, with preference an acid solution, for example dilute phosphoric acid or perchloric acid (0.01%-10%). In the case of a tantalum surface of the semifinished product, a growth of the oxide layer of about 2 nm/V can be expected in the case of a niobium surface with about 4 nm/V.

The surface of the oxidized semifinished product obtained may, if appropriate, be cleaned with a suitable solvent, such as for example water or ethanol, and then dried.

In a further step, the oxidized surface of the semifinished product is then re-reduced with a reducing agent. Lithium, magnesium, calcium, barium, strontium, aluminium, their hydrides or alloys or hydrogen may be used for example as the reducing agent. The reducing agent is in this case advantageously liquid or gaseous. Vapours of the metallic reducing agents are used with preference, it being possible, depending on the metal used, for the reduction to be performed at a temperature between 200° C. and 3000° C., advantageously 650° C. and 1500° C. The use of magnesium vapour at temperatures between 650° C. and 1500° C. has been found to be particularly preferred, the oxidized surface of the semifinished product being re-reduced with the formation of magnesium oxide. This leaves a sinter-active metal surface that is distinguished by an increased specific surface area in comparison with the starting material.

The oxides of the reducing agent that are produced during the reduction may, if appropriate, be removed by a solvent, such as for example a dilute acid, and then dried.

If a two-dimensionally formed semifinished product (for example films or sheets) is subjected to the process set out above, the targeted treatment of parts of the surface is also possible. Here, the surface of the semifinished product is at least partially masked before the treatment, so that only the non-masked region is oxidized, reduced and in this way structured in the way described above. For this purpose, for example, the surface of a tantalum or niobium sheet is coated with a photoresist. This photoresist is exposed through a mask, the mask having apertures which correspond to the areas that are to be structured. After the exposure, the photoresist is developed and the exposed parts of the resist removed. Depending on the type of photoresist, in principle an inverse procedure is also possible. In this way, part of the semifinished product remains coated by resist. During the oxidation, then only the non-coated part is oxidized and structured during the following reduction. Only this part then has the desired surface structure with an increased surface area (determinable for example by the BET method) or the other characteristic properties.

Resist remaining on the semifinished product can be removed after the oxidation, since it is not required during the reduction. This embodiment of the process is advantageous. However, removal can only be carried out after the reduction.

For the purposes of the present invention, an oxidation is understood with preference as meaning the oxidation of over 50% by weight, with preference over 80% by weight, with particular preference between 90 and 100% by weight, of the surface to be oxidized. For the purposes of the present invention, a reduction is understood with preference as meaning the reduction of over 50% by weight, with preference over 80% by weight, with particular preference between 90 and 100% by weight of the oxidized surface layer.

The process described has the effect that a firmly adhering layer with a distinctly higher specific surface area forms on the previously dense surface of the semifinished product. The structure of the sinter-active surface of the semifinished product can in this case be influenced in particular by the reducing temperature and the thickness of the oxide layer, so that an adaptation of the surface structure to the respective high-capacitance material to be sintered on can take place.

Consequently, a further subject matter of the present invention is the use of the described surface-structured semifinished products for producing high-capacitance components by bonding high-capacitance materials onto the semifinished product by means of sintering processes.

High-capacitance materials are, for example, high-capacitance metal powders but also further semifinished products with high-capacitance surfaces.

For example, high-capacitance metal powders containing refractory metals, with preference of titanium, molybdenum, tungsten, hafnium, vanadium, zirconium, niobium or tantalum, or alloys of such metals or mixtures of such powders, may be used for the sintering. Such high-capacitance metal powders may be obtained, for example, by the reduction of the corresponding metal oxide powders, using as the reducing agent, likewise with preference, evaporated lithium, magnesium, calcium, barium, strontium or aluminium, at a temperature as mentioned above, or their metal hydrides or hydrogen. For better reduction, reducing agents in powder form may also be added to the metal oxide in powder form. A particularly preferred process for producing suitable high-capacitance powders is described in WO 00/67936.

High-capacitance semifinished products to be sintered on may be produced by the process according to the invention described above.

In order to give the bonding of the high-capacitance material to the semifinished product sufficient stability, the high-capacitance material applied or pressed onto the semifinished product may, for example, be solidified at elevated temperature under protective gas or in a vacuum (sintering). In order to achieve adequate solidifying of the high-capacitance material with conventional semifinished products, the sintering is generally carried out at a temperature above 1500° C., depending on the high-capacitance material used. The optimum sintering conditions can be quickly established by a person skilled in the art himself by a small number of orienting tests. If tantalum powder is used as the high-capacitance material, the sintering is performed at usually 900° C. to 5000° C., advantageously at 1000° C. to 1300° C., in particular 1000° C. to 1200° C. If niobium powder is used as the high-capacitance material, the sintering is performed at usually 800° C. to 1400° C., advantageously at 100° C. to 1300° C., in particular 900° C. to 1200° C.

The prior surface treatment of the semifinished products described here to increase the sintering activity allows the sintering process to be performed at lower temperatures than with untreated semifinished products. The semifinished product according to the invention can consequently be referred to as more sinter-active. "More sinter-active" is the term used for materials which sinter more at the same temperature or else equally well at lower temperatures than less sinter-active materials at higher temperatures.

The treatment according to the invention therefore has the effect that the sintering temperature of treated semifinished products lies well below the sintering temperature of untreated semifinished products. The lowering of the sintering temperature attributable to the treatment may be 50° C. or more. The sintering temperature of treated semifinished product may even lie 100° C. or even 150 ° C. below the sintering temperature of untreated semifinished product. In extreme cases, lowerings of the sintering temperature by about 200° C. to about 500° C. are also possible.

The treatment according to the invention, i.e. oxidation of the semifinished product with subsequent reduction, gives the semifinished product a sinter-active surface. Apart from influencing the sintering temperature, this surface is distinguished by a foam-like structure that can be clearly demonstrated by corresponding measuring methods. The foam-like structure is formed substantially by the so-called primary particles, which are also referred to as primary grains.

By contrast with the treatment according to the invention, an alternative method of surface treatment, such as for example etching, does not lead to foam-like surface structures, but rather to channel-like surface structures, it also being possible for the channels to follow an angled path.

In this way, stable high-capacitance components are obtained without prolonging the necessary sintering time. As a result, the reduction of the surface area of the high-capacitance material by the sintering is minimized without having to accept disadvantages in the mechanical stability or the stability with respect to current and voltage peaks.

If the semifinished product takes the form of wire for anode contacting, the wire pull-off resistance (measured with a Chatillon DFGS 50 tension-compression measuring instrument) is increased by a factor of 1.1 to 5.

Used with particular preference are semifinished products with a structured surface which consist of the same material as the high-capacitance material used for the sintering. In particular, high-capacitance powders containing at least one refractory metal, such as for example powder of titanium, molybdenum, tungsten, niobium or tantalum or an alloy containing at least one of these metals, with an average primary particle diameter from 50 nm to 10 μm, with particular preference between 100 nm and 1 μm, and with a particle size distribution of secondary agglomerates from 1 to 300 μm, are suitable for sintering at temperatures of below 1500° C., advantageously below 1300° C., in particular 1200° C., with the described semifinished products with sinter-active surfaces. The use of a high-capacitance semifinished product for fusion by sintering with a surface-structured semifinished product described above is of particular interest. With preference, the semifinished products to be fused have been produced from the same material and with the same process conditions, so that they have a uniform surface structure.

After sintering on the high-capacitance material, the component obtained can also be coated with a dielectric layer, for example an oxide layer, in order to set the electrical properties of the component.

The high-capacitance components obtained may be fitted, for example, in capacitors or memory cells.

Methods:

The reduction, forming and measuring of the anodes described in the following examples was performed on the basis of the following parameters, unless expressly described otherwise in the examples.

Measuring the specific surface area:

Measuring the specific surface area was performed by means of BET measurement, i.e. by gas sorption according to Braunauer, Emmett and Teller, with an instrument from Micromeritics of the Tristar type.

Anodic oxidation:

| | |
|---|---|
| forming voltage | 20 V |
| forming current | 1 mA/g |
| final forming time | 2 h |
| electrolyte | 0.1% $H_3PO_4$ |
| temperature | 85° C. |

Measuring the capacitance

| | |
|---|---|
| electrolyte | 10% $H_3PO_4$ |
| temperature | 23° C. |
| frequency | 120 Hz |

Calculation of the microscopic surface:

The microscopic surface has been calculated from the determined capacitance according to the formula $C=\epsilon*A/d$, wherein C is the determined capacitance, $\epsilon$ is the dielectric constant of the metal oxide (here: tantalum pentoxide, $\epsilon$ is $27*10^{-12}$ F m$^{-1}$), d is the thickness of the dielectric oxide layer, calculated from the anodisation voltage by assuming a thickness of 2 nm per volt formation voltage (40 nm with an anodisation voltage of 20 V), A is the microscopic surface to be determined.

Reduction:

The oxidized semifinished product was subsequently placed onto a fine-meshed grating, under which a crucible was arranged. The crucible contained magnesium in twice the stoichiometric amount with respect to the oxygen content. After that, heating was carried out under argon to 950° C. for one hour. The magnesium thereby evaporated and reacted with the oxide layer of the semifinished product lying over it. After cooling of the metal surface, air was slowly added for passivation. The reduction material was washed with sulphuric acid and subsequently washed neutral with fully demineralized water (FD water) and dried.

The invention is explained below by examples and figures, these only being intended to explain the invention in more detail and not to restrict it.

EXEMPLARY EMBODIMENTS

Example 1

Ta sheets (1 cm×1 cm) are galvanostatically formed at 150 V in 0.1% phosphoric acid at 85° C. and potentiostatically formed for a further 2 h. An oxide layer about 300 nm thick is formed on the sheet. The formed sheet is washed with FD water and dried. The product was subsequently reduced as described above.

Figure 1:
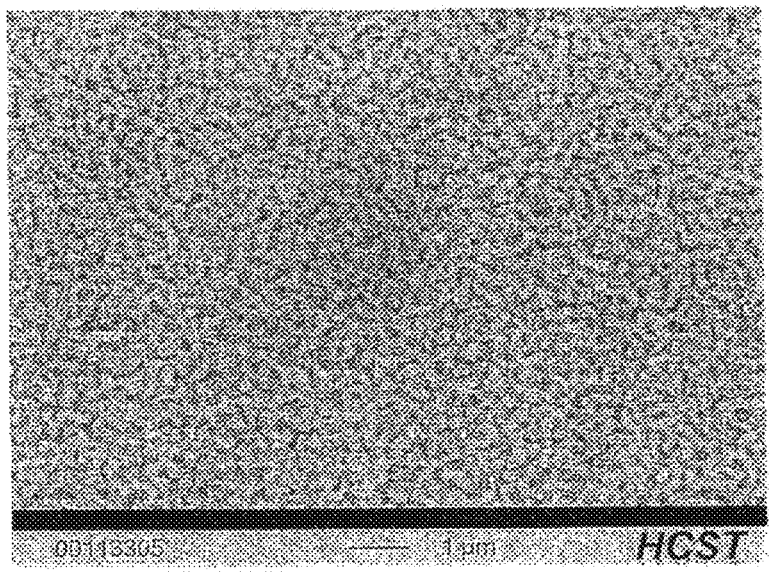
FIG. 1 shows the surface of a semifinished product (thickness of the layer 300 nm) after anodic oxidation and subsequent reduction with Mg vapour.

The structured surface can be seen on the following scanning electron microscope photo of FIG. 1. A subsequent anodisation of this sheet with 20 V produces a capacitance of 3.45 µF, which corresponds to a microscopic surface of 51 cm$^2$. Without a structured surface, the sheet has a capacitance which lies below the detection limit of 500 nF.

Example 2

Ta sheets (1 cm×1 cm) are galvanostatically formed at 400 V in 0.1% phosphoric acid at 85° C. and potentiostatically anodised for a further 2 h. An oxide layer about 800 nm thick is formed on the sheet. The formed sheet is washed with FD water and dried. The product was subsequently reduced as described above.

A subsequent forming of this sheet with 20 V produces a capacitance of 5.52 µF which corresponds to a microscopic surface of 81.7 cm$^2$. Without a structured surface, the sheet has a capacitance of less than 500 nF.

Figure 2:
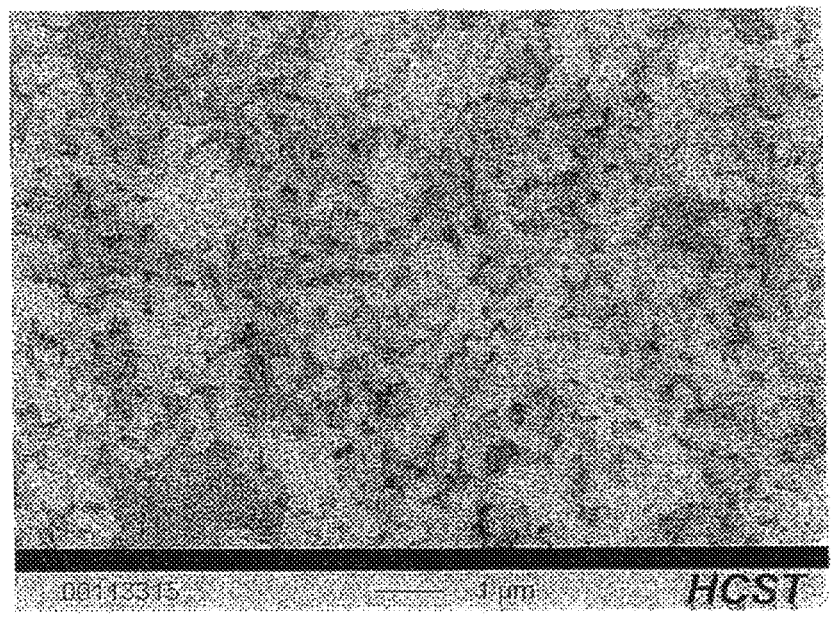
FIG. 2 shows the surface of a semifinished product (thickness of the layer 800 nm) likewise after anodic oxidation and subsequent reduction with Mg vapour.
Figure 3:
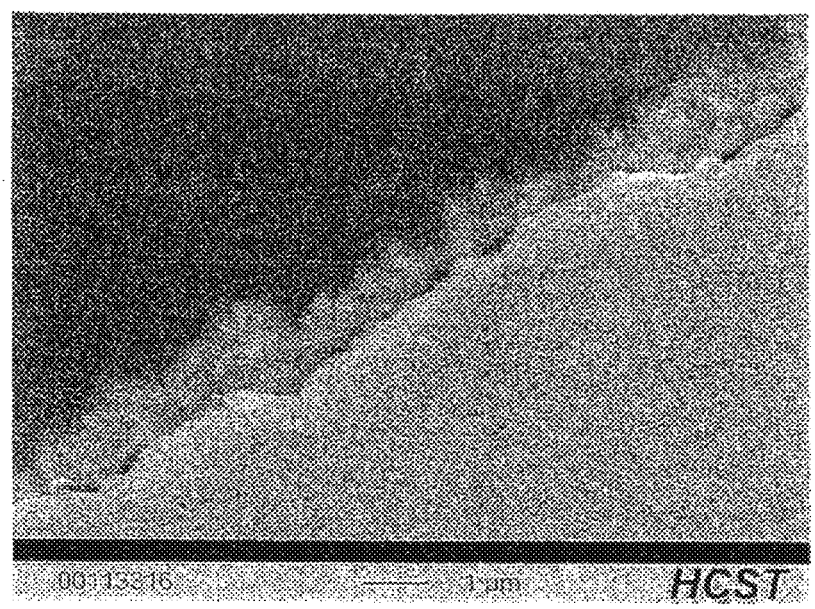
FIG. 3 shows the corresponding surface in cross section.

The scanning electron microscope photos of FIG. 2 and FIG. 3 show the structured surface as a plan view and as a cross-sectional image (micrograph).

Example 3

A Ta wire (dia.=0.49 mm) is galvanostatically formed at 400 V in 0.1% phosphoric acid at 85° C. and potentiostatically formed for a further 2 h. An oxide layer about 800 nm thick is formed on the wire. The formed wire is washed with FD water and dried. The product was subsequently reduced as described above.

Figure 4:
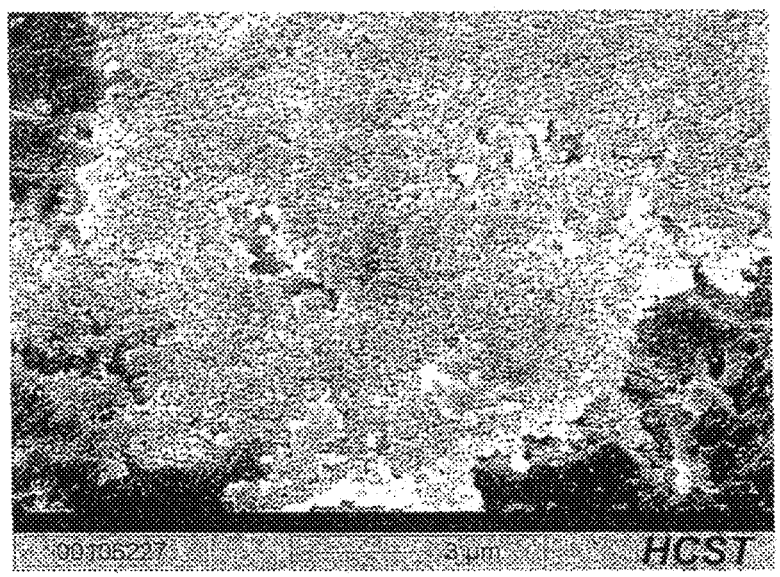
FIG. 4 shows the surface of a semifinished product (thickness of the layer 400 nm) after anodic oxidation and subsequent reduction with Mg vapour.

The scanning electron microscope photos (see FIG. 4) show the structured surface is a plan view.

The invention claimed is:

1. A semifinished product comprising a structured sinter-active surface, the surface being oxidized and subsequently re-reduced and including at least one refractory metal wherein a ratio of the microscopic surface area to the macroscopic surface area of the oxidized and re-reduced surface is in the range of 10 to 100,000, and wherein the oxidation of the structured sinter-active surface is thermal or anodic.

2. The semifinished product according to claim 1, wherein the structured sinter-active surface forms an anodic conductor and comprises titanium, molybdenum, tungsten, niobium, tantalum or an alloy containing one or more of these metals.

3. The semifinished product according to claim 1, wherein the structured sinter-active surface is doped with at least one of metals, metal ions, and one or more of the elements phosphorus, nitrogen, silicon or boron.

4. The semifinished product according to claim 1, wherein the structured surface is between 50 nm and 50 µm thick.

5. The semifinished product according to claim 1, wherein the structured surface has a thickness between about 50 nm and 10 µm and a capacitance between about 1 µF and 50 µF per cm$^2$ of base area when oxidized with a forming voltage of about 20 V.

6. The semifinished product according to claim 1, wherein a high-capacitance materials is coated onto the surface by sintering.

7. A high-capacitance component comprising a semifinished product, the semifinished product having a structured sinter-active surface, wherein the surface is oxidized and subsequently re-reduced and includes at least one refractory metal wherein a ratio of the microscopic surface area to the macroscopic surface area of the oxidized and re-reduced surface is in the range of 10 to 100,000, and wherein the oxidation of the structured sinter-active surface is thermal or anodic.

8. The component according to claim 7, further comprising a high-capacitance material sintered onto the surface.

9. The component according to claim 8, wherein the high-capacitance material is one of a high-capacitance powder and a high-capacitance semifinished product.

10. The component according to claim 8, wherein the high-capacitance material contains a refractory metal.

11. The semifinished product according to claim 1, wherein the surface of the product has a thickness between 10 nm and 1 mm.

12. The component according to claim 7, wherein the surface has a thickness between 10 nm and 1 mm.

13. The semifinished product according to claim 1, wherein the surface of the product has a thickness between 100 nm and 800 nm.

14. The semifinished product according to claim 2, wherein the structured sinter-active surface is doped with phosphorus.

15. The semifinished product according to claim 2, wherein the structured sinter-active surface is doped with nitrogen.

16. The semifinished product according to claim 2, wherein the structured sinter-active surface is doped with silicon.

17. The semifinished product according to claim 2, wherein the structured sinter-active surface is doped with boron.

* * * * *